March 24, 1953
J. H. BRODIE
2,632,301
HYDRAULIC BRAKING APPARATUS
Filed Aug. 31, 1950
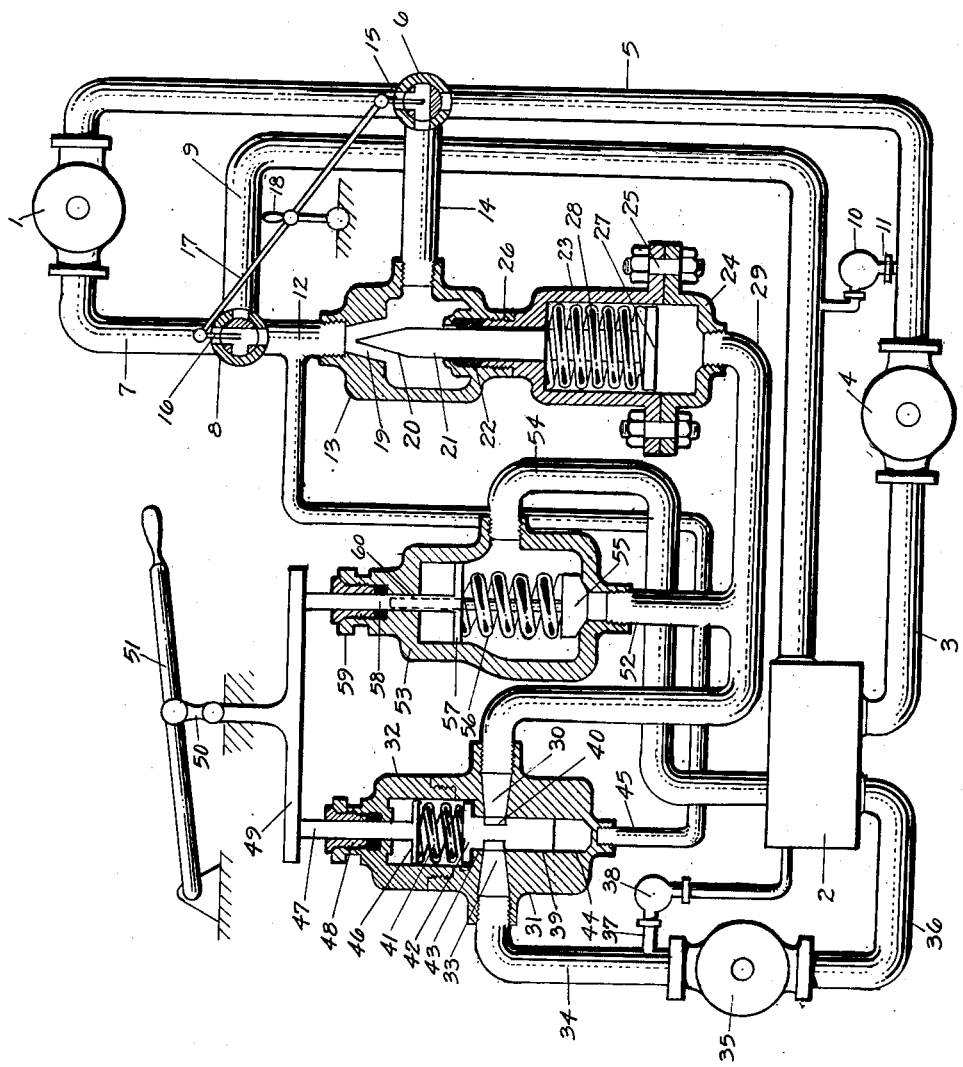
JAMES H. BRODIE, INVENTOR.
BY
Cameron, Kerkam, & Sutton
ATTORNEYS Patented Mar. 24, 1953

2,632,301

UNITED STATES PATENT OFFICE 2,632,301

HYDRAULIC BRAKING APPARATUS

James H. Brodie, Baltimore, Md.

Application August 31, 1950, Serial No. 182,538

5 Claims. (Cl. 60—53)

This invention relates to the regulation of flow of a hydraulic fluid by means of an orifice of variable area which can be adjusted or set to a size affording a desired amount of restriction of and resistance to the fluid flow and thus building up a desired amount of back pressure in the line leading to the orifice. More particularly, the invention relates to apparatus of the above type that is responsive to variations occurring in such back pressure so as to adjust automatically the area of the orifice, without changing the setting of the apparatus, in order to maintain a substantially uniform back pressure corresponding to said setting regardless of variations of pressure in the source to which the line is connected.

Apparatus of the type characterized above can be used in any hydraulic system in which it is desired to maintain a substantially constant resistance to flow of a pressure fluid, or in other words a substantially constant back pressure in a hydraulic pressure line. Such apparatus is especially useful in connection with hydraulic braking systems, generally speaking, wherein the orifice restriction is opposed to a pumping effort for any desired purpose. For instance, the invention can be utilized in the foregoing manner to retard or brake the movement of various types of moving bodies, such as rotary cylinders, rolls or drums, moving vehicles, and the like. It is particularly suited for application to hydraulically driven machines or mechanisms in which the driving motor may also serve as a pump operating against a controllable back pressure.

The accompanying drawing illustrates diagrammatically the application of the invention to the braking of a hydraulic driving motor, but it is to be expressly understood that this embodiment is by way of example only and that the drawing is not to be construed as a definition of the limits of the invention, reference being had to the appended claims for this purpose.

Referring to the drawing, 1 indicates a hydraulic driving motor of any suitable type for driving or operating any desired moving body. A supply of hydraulic pressure liquid is maintained in a reservoir 2 from which the liquid is drawn through a pipe 3 to the suction side of a pump 4 of any suitable type which delivers the liquid under pressure through a pipe 5 and a suitable valve 6 to the motor 1. The liquid discharged from the motor returns to the reservoir by way of a pipe 7, a suitable valve 8, and a pipe 9. It will be understood that the apparatus thus far described is typical of various known types of hydraulic driving apparatus.

When it is desired to retard or brake the rotation of the driving motor 1, the valve 6 is shifted to the position shown in the drawing, cutting off the supply of pressure liquid to the driving motor. In case the main pump 4 continues to operate under these conditions and in order to prevent building up an excessive pressure in the line 5, a pressure relief valve 10 of any suitable type may be provided in a pipe 11 connecting the pipes 5 and 9. The motor 1, being drivingly connected to the moving body, now continues to operate as a pump. The valve 8 being also shifted to the position shown in the drawing, the liquid pumped by the motor 1 flows through the valve 8 and through a pipe 12 to a suitable flow-constricting device indicated generally at 13, from which the liquid returns by way of a pipe 14, the valve 6 and the pipe 5 to the intake side of the motor. The valves 6 and 8 may be of any suitable type and as shown comprise three-way valves movable to two positions 90° apart. Preferably these valves are connected in any suitable manner for simultaneous operation between these two positions, and as indicated diagrammatically in the drawings, the valve operating arms 15 and 16 are linked together by a rod 17 which can be shifted by means of a suitable handle 18.

The magnitude of the braking effect is determined by the restriction of flow provided by the device 13 which comprises a variable orifice of any suitable type. In the form shown, this device comprises a tapered substantially conical inlet opening 19 in which is movable the tapered end 20 of a rod 21 sliding in a packing 22. The rod 21 is moved by a hydraulic operating device of any suitable type, here shown as comprising a two-part casing 23, 24 bolted together at 25 and attached at 26 to the flow-restricting device 13. The lower end of the rod 21 carries a piston head 27 which is urged in a direction to withdraw the tapered end 20 from the opening 19 by suitable resilient means such as a coil spring 28. The rod 21 is moved in the opposite direction, compressing the spring 28, when hydraulic pressure fluid is admitted to the lower end of the casing 23, 24 through a pipe 29, thus advancing the rod 20, 21 into the opening 19 and progressively restricting the orifice area.

Adjustable means are provided for moving the rod 21 initially to a position corresponding to a desired back pressure that is to be maintained in the pipe 7. As the motor 1 slows down, however, its pumping effort decreases and accordingly the back pressure in the pipe 7 decreases and the retarding or braking effect is diminished.

In order to maintain the back pressure substantially constant at the desired value for which the apparatus is initially set, therefore, the adjustable means mentioned above is responsive to said back pressure in such a way as to compensate for variations of said back pressure. Preferably these objectives are accomplished by the provision of a suitable valve for controlling the supply of hydraulic operating fluid to the piston 27, said valve being movable in one direction by resilient means that are settable to determine the value of the back pressure to be maintained in the pipe 7, and being moved in the opposite direction by hydraulic means responsive to said back pressure in the pipe 7.

In the form shown, the pipe 29 which supplies hydraulic operating fluid to the piston 27 is connected to the outlet port 30 of a valve body 31 having a threaded cap 32. The inlet port 33 of the valve body is connected by a pipe 34 to a suitable pump 35 which draws fluid from the reservoir 2 by means of a pipe 36 and supplies said fluid under suitable pressure through the valve 31 and pipe 29 to the piston 27. When the valve 31 is closed, and in order to prevent building up an excessive pressure in the pipe 34, a by-pass pipe 37 and pressure relief valve 38 may connect the pipe 34 to the reservoir 2.

The valve body 31 contains a piston valve 39 provided with a circumferential groove 40 which, in the open position of the valve shown in the drawing, is aligned with the valve ports 30 and 33. The piston 39 is normally maintained in this position by a spring 41 acting against the piston head 42 which engages a shoulder 43 in the valve body 31. However, the valve piston can be moved to closed position against the spring 41 by hydraulic pressure in the chamber 44 at the opposite end of the piston 39, said chamber being connected by a pipe 45 with the pipe 12 at a point between the motor 1 and the flow-restricting device 13.

The supply of pressure fluid to the piston 27 results in progressive restriction of the orifice 19, 20 and in progressive increase in the back pressure in the pipe 7 which back pressure is transmitted through the pipe 45 to the chamber 44. When this pressure exceeds the compression of the spring 41, the valve piston 39 is moved to closed position to cut off the supply of pressure fluid to the piston 27, after which the tapered rod 20, 21 remains stationary until there is a further variation in the back pressure in the pipe 7. The position which the rod 20, 21 assumes initially, therefore, depends on the loading of the spring 41 which can be varied in any suitable manner. The drawing illustrates a system adapted for manual control of the spring loading, and to this end the upper end of the spring is engaged by the head 46 of a rod 47 which passes out of the cap piece 32 through a suitable gland 48 into engagement with a loading device 49 operated by a link 50 and a handle 51.

When it is desired to discontinue the braking effect, the pressure in the pipe 29 is relieved by connecting this pipe through a suitable relief valve back to the reservoir 2. In the form shown, a branch 52 of the pipe 29 is connected to a relief valve body 53 which is in turn connected by a pipe 54 with the reservoir 2. Escape of the pressure liquid from the pipe 29 is controlled by a valve 55 urged toward closed position by a spring 56. In order to prevent opening of the valve 55 when the braking effect is in use, the spring 56 may be loaded simultaneously with the spring 41 by any suitable means here shown as comprising a head 57 on the end of a rod 58 which passes out of the valve body 53 through a gland 59 and into engagement with the loading device 49 mentioned above. The valve rod 60 which carries the valve 55 may be extended into a recess in the rod 58 for guiding purposes. When the handle 51 is operated to load the valve 39, the valve 55 is simultaneously loaded sufficiently to prevent its opening by the pressure developed by the pump 35. When the handle 51 is moved in the opposite direction, however, the spring 56 is unloaded and in this condition is weaker than the spring 28 so that the valve 55 opens. Now the liquid discharged by the pump 35 passes through the valves 39 and 55 and returns to the reservoir through the pipe 54, and also the piston 27 gradually descends and withdraws the tapered rod 20, 21 from the opening 19 of the flow-restricting device 13.

The operation of the system may be summarized briefly as follows. When the motor 1 is being driven by the pump 4, the valves 6 and 8 are shifted in a clockwise direction through an angle of 90° so that no liquid flows from the motor 1 to the flow-restricting device 13. The handle 51 being released, there is no loading of the springs 41 and 56. The valve piston 39 occupies the position shown in the drawings, but the valve 55 is open, the piston 27 occupies its lowermost position, and the liquid circulated by the pump 35 passes through the valves 39 and 55 and returns to the reservoir 2. When it is desired to retard the motor 1, the valves 6 and 8 are shifted back in a counterclockwise direction to the position shown in the drawing so that the motor operates as a pump circulating liquid through the orifice 19, 20. The handle 51 is now depressed to any desired degree, loading the springs 41 and 56 and closing the valve 55. The pressure liquid circulated by the pump 35 now enters the casing 24 and lifts the piston 27 and rod 21 to decrease the orifice area and to increase the back pressure in the pipe 7. When this back pressure reaches a value such as to overcome the loading of the spring 41, the piston valve 39 is shifted to closed position and the rod 21 becomes stationary.

The apparatus is thus set initially to provide a desired degree of retarding or braking effect on the motor 1. However, this retarding action gradually slows down the motor and decreases the amount of liquid circulated by it through the orifice 19, 20 with the result that the braking effect is diminished. This result is reflected in a decrease of back pressure in the pipe 7 so that the spring 41 comes into action to move the piston valve 39 again to the open position shown in the drawings. The pump 35 is again able to deliver pressure liquid to the piston 27 and to move the tapered rod 20, 21 further into the opening 19, thus decreasing the orifice area and increasing the back pressure in the pipe 7 until it again overcomes the spring 41 and moves the piston valve 39 to closed position. This action continues automatically as long as the position of the loading device 49 is maintained, and thus maintains the back pressure in the pipe 7 at a substantially constant value corresponding to the initial setting of the apparatus. This setting can be varied at any time by shifting the position of the handle 51.

When braking effect is no longer desired and the handle 51 is released and restored to its neutral or inoperative position, the spring 56 is unloaded and the valve 55 opens as explained above, thus permitting the piston 27 to descend and the rod 20, 21 to be withdrawn until the orifice is opened to the full extent ready for the next braking operation.

While only one embodiment of the invention has been described and illustrated in the drawing, it will be understood that the invention is not restricted to this embodiment and that various changes may be made in the form, details of construction, and arrangement of parts without departing from its spirit. Reference, therefore, should be had to the appended claims for a definition of the limits of the invention.

What is claimed is:

1. In a hydraulic system having a hydraulic pressure line connected to a source of varying pressure, means for constricting the flow of hydraulic fluid in said line and maintaining a substantially constant back pressure therein comprising a movable member for variably restricting the flow through said line, hydraulically operated means for moving said member, a source of hydraulic pressure connected to said hydraulically operated means, a relief valve connected to the pressure line between said source of hydraulic pressure and said hydraulically operated means for relieving pressure therein and returning said member to normal position and means for controlling the supply of fluid to said hydraulically operated means and thereby regulating said back pressure comprising a valve, resilient means for moving said valve to open position, and means subjected to said back pressure for moving said valve to closed position against said resilient means.

2. In a hydraulic system having a hydraulic pressure line connected to a source of varying pressure, means for constricting the flow of hydraulic fluid in said line and maintaining a substantially constant back pressure therein comprising a member movable in one direction to progressively restrict the flow through said line, hydraulically operated means for moving said member in said one direction, resilient means for moving said member in the opposite direction, a source of hydraulic pressure connected to said hydraulically operated means, a control valve for controlling the supply of fluid to said hydraulically operated means, a relief valve connected to the pressure line between said source of hydraulic pressure and said hydraulically operated means, means for simultaneously loading said control valve toward open position and said relief valve toward closed position, and means subjected to said back pressure for moving said control valve to closed position when said back pressure exceeds a value corresponding to the loading of said control valve.

3. A hydraulic driving system for a vehicle comprising a hydraulic driving rotor for a wheel of the vehicle which is drivable by said wheel as a hydraulic pump, hydraulic braking means including a flow-restricting device having a movable member for variably restricting liquid flow therethrough, valve means for connecting said rotor to said device to pump liquid therethrough, hydraulically operated means for moving said member to a flow-restricting position corresponding to a desired braking effect, a source of hydraulic pressure connected to said hydraulically operated means, and means for regulating the position of said member including a valve controlling the supply of hydraulic fluid to said hydraulically operated means, resilient means urging said valve toward open position, and means subjected to the back pressure between said device and rotor when said rotor is connected to said device for moving said valve toward closed position.

4. Apparatus as defined in claim 3, including means for adjustably loading said resilient means.

5. Apparatus as defined in claim 3, including a relief valve connected to the pressure line between said source of hydraulic pressure and hydraulically operated means for relieving pressure therein and returning said member to normal position.

JAMES H. BRODIE.

REFERENCES CITED

The following references are of record in the file of this patent:

UNITED STATES PATENTS

| Number | Name | Date |
|---|---|---|
| 569,781 | Brown | Oct. 20, 1896 |
| 1,156,165 | McManamy | Oct. 12, 1915 |
| 1,190,799 | René | July 11, 1916 |
| 1,664,493 | Smith | Apr. 3, 1928 |
| 1,690,093 | Allen | Nov. 6, 1928 |
| 2,275,321 | Scates | Mar. 3, 1942 |
| 2,413,162 | Ackerman | Dec. 24, 1946 |
| 2,445,573 | Godbe | July 20, 1948 |